US006543687B2

(12) United States Patent
Negley et al.

(10) Patent No.: US 6,543,687 B2
(45) Date of Patent: Apr. 8, 2003

(54) GASOLINE DISPENSING UNIT AND METHOD WITH IMPROVED DISPLAY

(75) Inventors: Scott Robertson Negley, Austin, TX (US); David Eric Embertson, Austin, TX (US)

(73) Assignee: Dresser, Inc., Addison, TX (US)

( * ) Notice: Subject to any disclaimer, the term of this patent is extended or adjusted under 35 U.S.C. 154(b) by 42 days.

(21) Appl. No.: 09/774,140

(22) Filed: Jan. 30, 2001

(65) Prior Publication Data

US 2002/0100800 A1 Aug. 1, 2002

(51) Int. Cl.[7] ................................................ G06F 7/08
(52) U.S. Cl. ....................................... 235/381; 235/375
(58) Field of Search ................................. 235/375, 381

(56) References Cited

U.S. PATENT DOCUMENTS 5,962,829 A * 10/1999 Yoshinaga .................. 235/381

FOREIGN PATENT DOCUMENTS

JP 0442390 * 2/1992

* cited by examiner

*Primary Examiner*—Harold I. Pitts
(74) *Attorney, Agent, or Firm*—Jenkens & Gilchrist, P.C.

(57) ABSTRACT

A gasoline dispensing unit method according to which two displays are providing in an overlaying relationship and display information relating to the dispensing and sale of the gasoline. It is emphasized that this abstract is provided to comply with the rules requiring an abstract that will allow a searcher or other reader to quickly ascertain the subject matter of the technical disclosure; and is submitted with the understanding that it will not be used to interpret or limit the scope or meaning of the claims under 37 CFR §1.72.

24 Claims, 2 Drawing Sheets

GASOLINE DISPENSING UNIT AND METHOD WITH IMPROVED DISPLAY

This invention relates to a gasoline dispensing unit and method of dispensing gasoline, more particularly, to such a unit and method utilizing an improved display.

DETAILED DESCRIPTION

Figure 1:
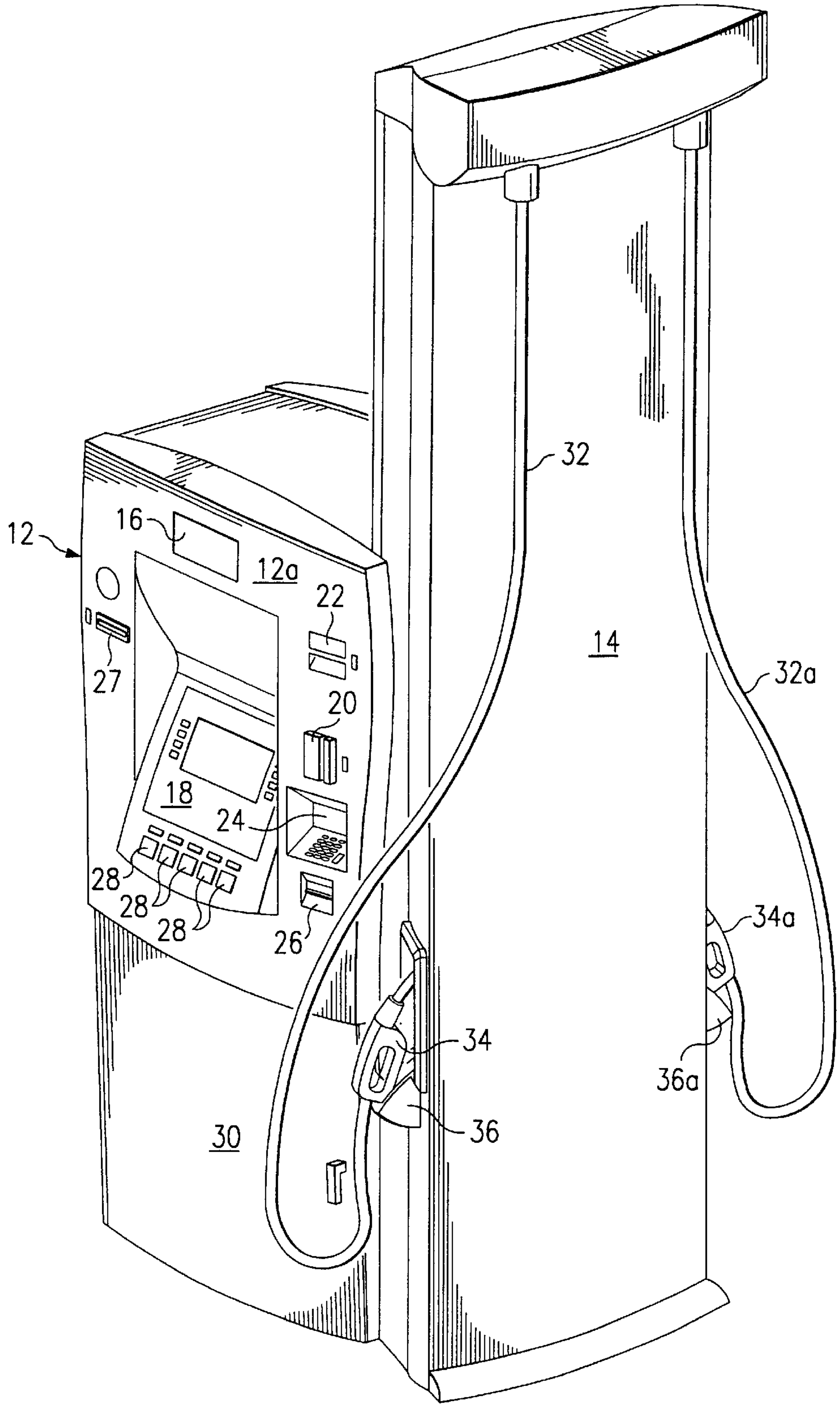
FIG. 1 is an isometric view of a gasoline dispensing unit according to an embodiment of the present invention.

With reference to FIG. 1 of the drawing, the reference numeral 10 refers, in general, to a gasoline dispensing unit consisting, in general, of a dispenser housing 12 and a hose tower 14 extending to one side of the housing.

The housing 12 includes a front bezel, or panel, 12*a*, a side portion of which overlaps a portion of the hose tower 14. A display 16 in the upper portion of the panel 12*a* for displaying information relating to the sale of the gasoline as will be described.

A recessed display 18 is provided below the display 16 and displays miscellaneous information not connected with the sale for viewing by the customer. A credit card reader 20 extends to one side of the display 18 and between a bar code scanner 22 and a numerical keypad 24. A receipt dispenser 26 extends below the keypad 24 and a bill acceptor 27 extends on the other side of the display 18. A series of octane select buttons 28 are mounted below the customer information display 18.

It is understood that a compartment (not shown) is provided in the lower portion of the housing 12 below the panel 12*a*, and receives hydraulics which include a conduit (not shown) that extends to an underground storage tank for the gasoline to be dispensed. A door 30 encloses a portion of the above compartment and can be detachably connected to the housing 12 in any known manner such as by hinges, screws, bolts, or the like, all of which are removable to permit access to the compartment.

A hose 32 extends from the upper portion of the hose tower 14 and the above-mentioned conduit extends to the hose tower and is connected to one end of the hose. The other end of the hose 32 is connected to a nozzle 34 for dispensing the gasoline to a vehicle. A boot 36 is provided on a side wall of the hose tower 14 for receiving the nozzle 34 during non-use.

A boot 36*a*, identical to the boot 36, is provided on the other side wall of the hose tower 14, and receives a nozzle 34*a* which is identical to the nozzle 34. The nozzle 34*a* is connected to one end of a hose 32*a* which is identical to the hose 32, and the other end of the hose 32*a* also extends from the upper portion of the hose tower 14. Although not shown in the drawing, it is understood that the dispenser housing 12 has a rear panel, or bezel, that receives components that are identical to the components on the front panel 12*a*, as described above. It is also understood that a hose tower, identical to the hose tower 14, can be provided at the other side of the housing 12.

Figure 2A:
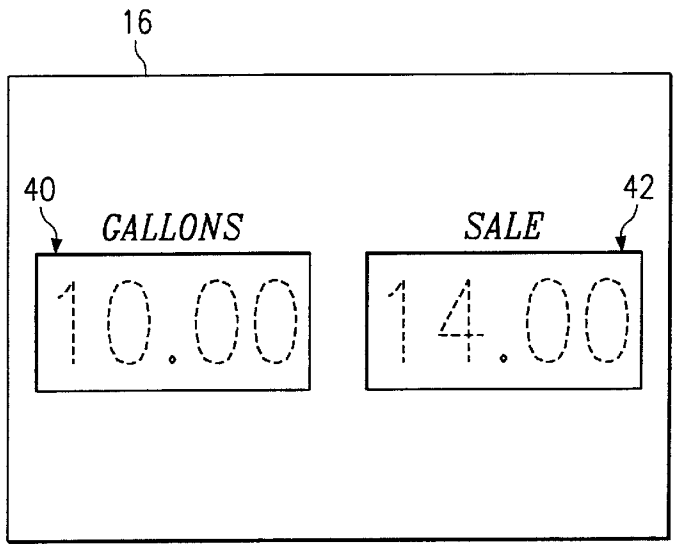
FIGS. 2A and 2B are enlarged, front elevational view of a portion of the display of the gasoline dispensing unit of FIG. 1.
Figure 2B:
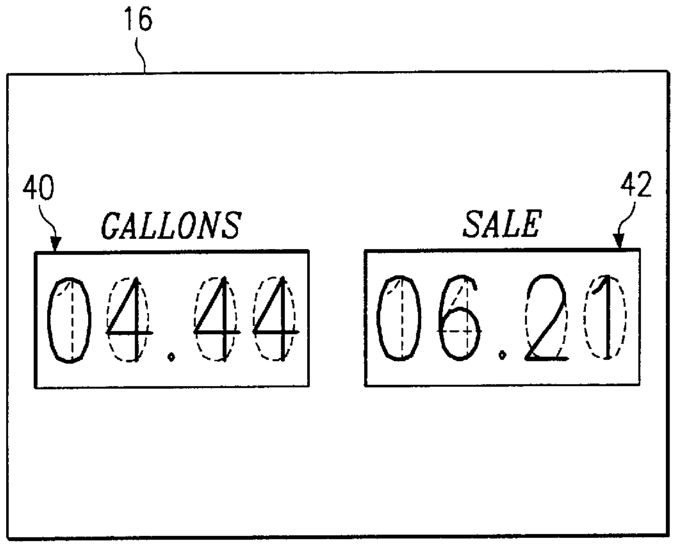
Figure 3:
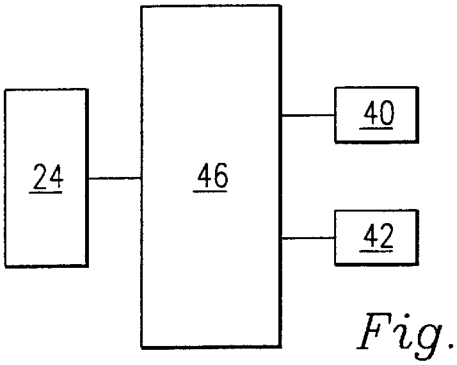
FIG. 3 is a diagrammatic view of a control unit for controlling the display.

As shown in FIGS. 2A and 2B, the display 16 includes two display modules 40 and 42 indicating GALLONS and SALE, respectively. The numerical keypad 24 (FIG. 1) is used to input numerals which are displayed on the modules 40 and 42 in a conventional manner. To this end, a control unit 46, in the form of a microprocessor, a CPU, or the like, is mounted behind the front panel 16 and is shown in FIG. 3. The control unit 46 is electrically connected to the display modules 40 and 42 as well as to the keypad 24 for receiving the input signals from the keypad, making all required calculations and comparison, and activating the modules to display the information to be displayed.

The displayed numbers shown in FIG. 2A are for the purposes of example and are preset by the customer by engaging the keypad 24 as described above before the dispensing operation commences. These numbers are represented in phantom lines since they are formed by an overlay to the regular display, as will be discussed in detail later. In the example shown, the customer has preset the gallons display module 40 by engaging the keypad 24 to preset the desired amount of ten gallons. Assuming the cost per gallon is $1.40, the above-mentioned control unit 46 responds to this input and activates the cost display module 42 to display the total cost of $14.00 for the anticipated transaction.

The customer then completes the pre-dispensing steps, inserts the nozzle 32 into the vehicle and activates the nozzle to commence the dispensing operation. The regular displays associated with the modules 40 and 42 are activated by the control unit 46 in response to the dispensing of the gasoline, and, as shown in FIG. 2B, begin to display the actual amount of gallons dispensed and the total accumulated cost, respectively. For the purpose of illustration, the latter numbers are shown in solid lines and are an example of the numbers that would be displayed during the dispensing process and before the preset values discussed above are reached.

When the actual amount of gallons dispensed, and the accumulated cost of same, reach the preset values of 10 gallons and $14.00, respectively, as displayed by the overlay portion of the modules 40 and 42, the control unit 46 deactivates the overlay displays which disappear to signal the customer that the preset amounts have been reached. Also, the control unit 46 shuts off the dispensing system to terminate any further dispensing past the preset amounts.

It is understood that the customer can also initially set the cost module 42 to a preset amount of cost, rather than gallons, before commencing the dispensing operation and the system will function in the same manner as discussed above.

It is also understood that the display 16 can display additional information such as cost per gallon, the grade of gasoline (in terms of octane rating) being dispensed, etc., while the display 18 can display instructions to guide the customer through the various predispensing and dispensing steps such as type of payment, octane selection, etc., and including the above presetting of the displays of the modules 40 or 42.

The display 16 and the modules 40 and 42 can be of any conventional type such as those manufactured by Planar Systems, Inc., W7514 Hwy V, Lake Mills, Wis.

Other variations may be made in the foregoing without departing from the scope of the invention. For example, the keypad 24 can be provided with buttons to advance the numerical values displayed on the display 16 until the desired figures are reached and/or provide for direct entry of same. Also, spatial references, such as "above", "below", "side", "front", and "rear" are for the purpose of illustration only and does not limit the specific orientation or location of the structure described above.

Since other modifications, changes, and substitutions are intended in the foregoing disclosure, it is appropriate that the appended claims be construed broadly and in a manner consistent with the scope of the invention.

What is claimed is:

1. A gasoline dispensing unit comprising a housing having a front panel; a first display unit for displaying numerical information corresponding to amount of gasoline to be dispensed, and a second display unit for displaying numerical information corresponding to the amount of gasoline actually dispensed, one of the display units overlaying the other display unit; and means mounted on the housing for enabling the numerical information displayed by the first display to be preset.

2. The unit of claim 1 wherein the means comprises at least one button which, when engaged, changes the numbers on the display.

3. The unit of claim 1 wherein the means is a numerical keypad mounted on the front panel.

4. The unit of claim 1 wherein the displays are identical when the amount of gasoline actually dispensed equals the preset amount.

5. The unit of claim 1 wherein the dispensing is terminated when the amount of gasoline actually dispensed equals the preset amount.

6. A gasoline dispensing unit comprising a housing having a front panel; a display unit mounted on the front panel and comprising a first display for displaying numerical information corresponding to cost of the gasoline to be dispensed, and a second display for displaying numerical information corresponding to the cost of gasoline actually dispensed, one of the displays overlaying the other display; and means mounted on the housing for enabling the numerical information displayed by the first display to be preset.

7. The unit of claim 6 wherein the means comprises at least one button which, when engaged, changes the numbers on the display.

8. The unit of claim 6 wherein the means is a numerical keypad mounted on the front panel.

9. The unit of claim 6 wherein the displays are identical when the cost of the gasoline actually dispensed equals the preset amount.

10. The unit of claim 6 wherein the dispensing is terminated when the cost of the gasoline actually dispensed equals the preset amount.

11. A method for dispensing gasoline comprising the steps of displaying numerical information corresponding to amount of gasoline to be dispensed, presetting the numerical information displayed as a result of the step of displaying, and displaying numerical information corresponding to the amount of gasoline actually dispensed, one of the displays overlaying the other display.

12. The method of claim 11 wherein the step of presetting comprising the step of manually actuating at least one button which, when actuated, changes the numbers on the display.

13. The method of claim 11 further comprising the step of deactivating one of the displays when the amount of gasoline actually dispensed equals the preset amount.

14. The method of claim 11 further comprising the step of terminating the dispensing of the gasoline when the amount of gasoline actually dispensed equals the preset amount.

15. A method for dispensing gasoline comprising presetting on a first display numerical information corresponding to the cost of the gasoline to be dispensed, and displaying on a second display numerical information corresponding to the cost of the gasoline actually dispensed, and overlaying one of the displays over the other display.

16. The method of claim 15 wherein the step of presetting comprising the step of manually actuating at least one button which, when actuated, changes the preset numerical information on the first display.

17. The method of claim 15 further comprising the step of terminating the dispensing of the gasoline when the displays display the same numerical information.

18. A method for dispensing gasoline comprising the steps of providing a first display displaying numerical information corresponding to the dispensing of the gasoline, and overlaying the first display with a second display that displays additional information relating to the dispensing of the gasoline.

19. The method of claim 18 wherein the first display displays the amount of gasoline dispensed, and wherein the second display displays a preset amount of gasoline to be dispensed.

20. The method of claim 18 further comprising the step of presetting the amount of gasoline to be dispensed.

21. The method of claim 18 wherein the first display displays the cost of the gasoline dispensed, and wherein the second display displays a preset amount of cost of the gasoline to be dispensed.

22. The method of claim 21 further comprising the step of presetting the cost of the gasoline to be dispensed.

23. The method of claim 22 wherein the step of presetting comprising the step of manually actuating at least one button which, when actuated, changes the numbers on the display.

24. The method of claim 18 further comprising the step of terminating the dispensing of the gasoline when the displays display the same numerical information.

* * * * *